C. P. LENZ.

Extension-Tables.

No. 5,911. Reissued June 9, 1874.

Witnesses:

Chas. Raetig.
F. V. Briesen

Inventor:

C. P. Lenz
by
A. V. Briesen
his attorney.

UNITED STATES PATENT OFFICE.

CHARLES PHILIPP LENZ, OF POUGHKEEPSIE, NEW YORK.

IMPROVEMENT IN EXTENSION-TABLES.

Specification forming part of Letters Patent No. 100,776, dated March 15, 1870; reissue No. 5,911, dated June 9, 1874; application filed January 24, 1874.

*To all whom it may concern:*

Be it known that I, CHARLES PHILIPP LENZ, of Poughkeepsie, in the county of Dutchess and State of New York, have invented a new and Improved Extension-Table, of which the following is a specification:

The invention has for its object to so improve extension-tables that the same will constitute a receptacle for table-covers, napkins, and other articles used on the table. The invention consists in combining a bureau or case containing drawers or shelves with the table, the said bureau or case forming the support of the middle set of rails, and being thereby out of the way and almost entirely out of sight.

Figure 1:
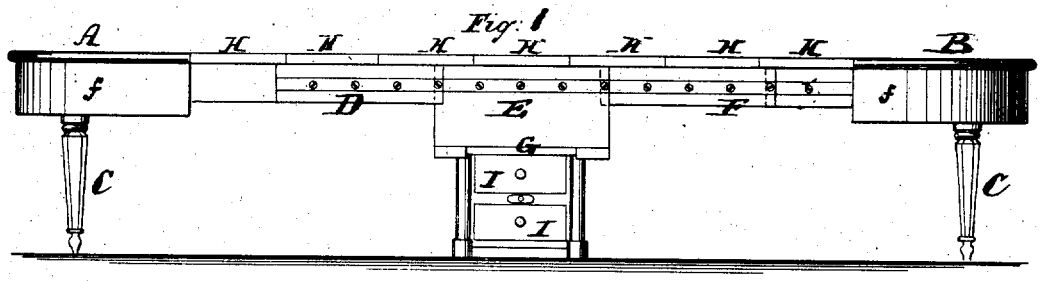
Figure 2:
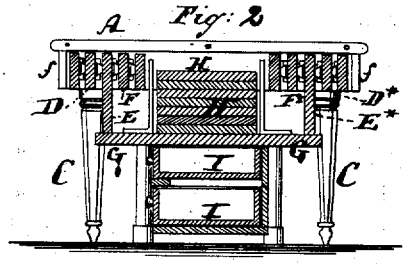
Figure 3:
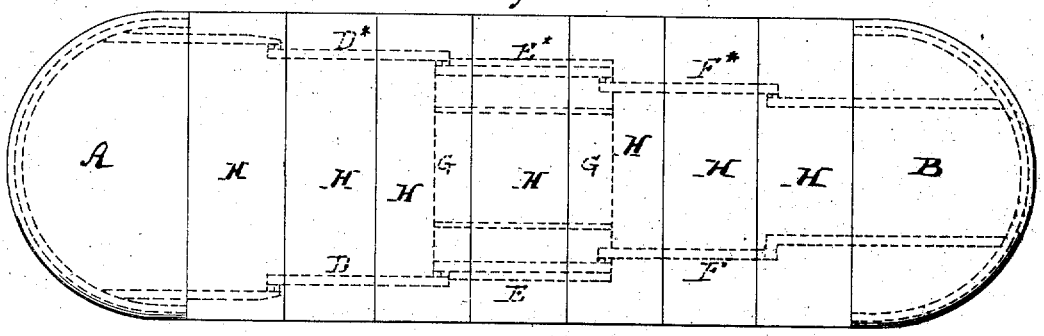
Figure 4:
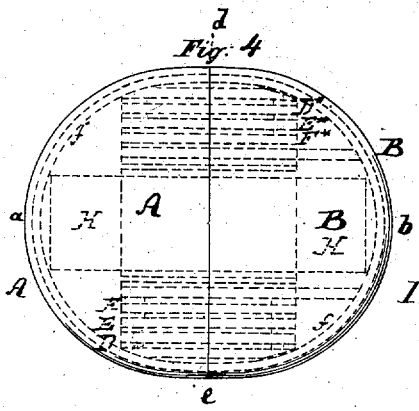

A and B in the drawing are the ends of an extension-table of suitable form, size, and construction. D E F and $D^{\times}$ $E^{\times}$ $F^{\times}$ are the extension-rails connecting the ends of the table. One set of these rails, say, E $E^{\times}$, is made wider than the remainder, as is clearly shown in Figs. 1 and 2, and these rails E $E^{\times}$ are connected at their lower edges by a transverse board, G. This board constitutes a support for the removable extension-leaves H H, &c., which are, when not in use, placed upon it, as in Fig. 2, and concealed beneath the table top. The middle set of rails, which is usually supported by a center leg, I support by a bureau or case, I, which is either provided with drawers or with doors and shelves, and which serves as a convenient receptacle for the articles to be used on the table. C C are the legs for supporting the ends of the table. *f f* are the sides or curtains. The several legs of the table and the bottom of the case I are to be provided with casters, in the ordinary manner. If one of the casters should be lost there will be a sufficient number to hold the table steady.

I claim—

The combination of an extension-table with a bureau or case supporting the central pair of extension-rails, as set forth.

CHARLES PHILIPP LENZ.

Witnesses:

S. BETZ,

PROF. A. KOELLING.